May 26, 1925.  
M. J. KIRST  
CLUTCH CONTROL  
Filed March 17, 1924  
1,539,796  
2 Sheets-Sheet 1

Inventor
M. J. Kirst
By Lancaster and Allwine
Attorneys

May 26, 1925.
M. J. KIRST
1,539,796
CLUTCH CONTROL
Filed March 17, 1924   2 Sheets-Sheet 2
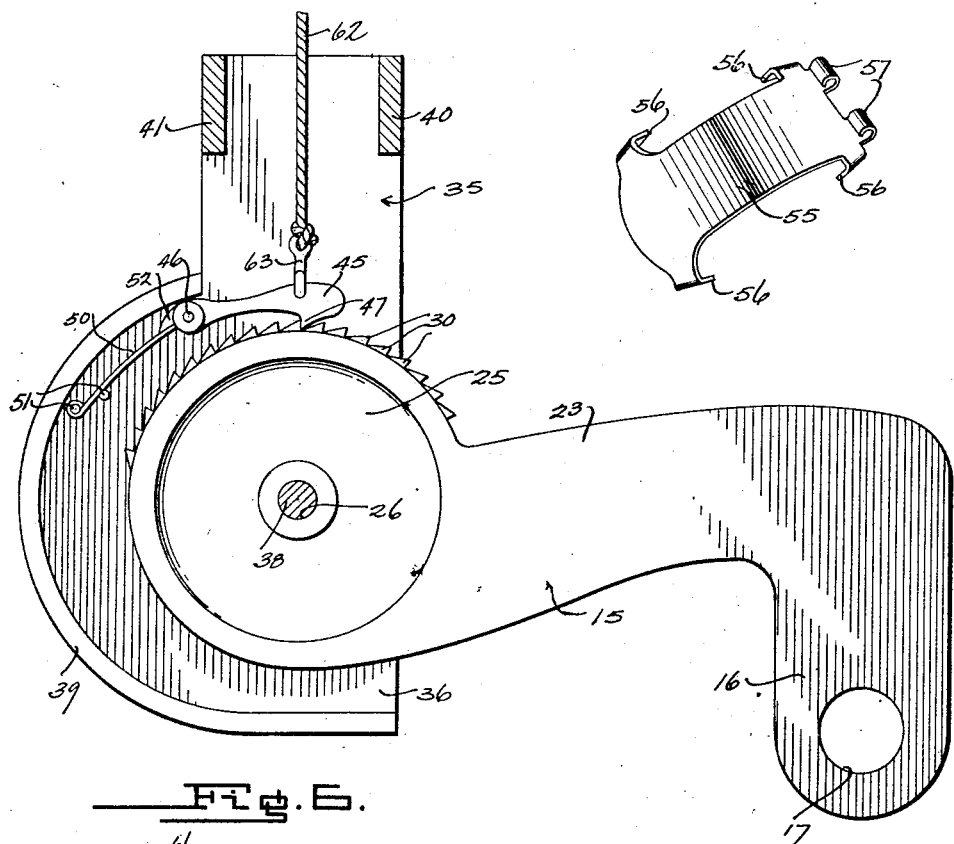
Inventor
M. J. Kirst
By Lancaster and Allwine
Attorneys Patented May 26, 1925.

1,539,796

UNITED STATES PATENT OFFICE.

MICHAEL J. KIRST, OF BARRINGTON, ILLINOIS.

CLUTCH CONTROL.

Application filed March 17, 1924. Serial No. 699,903.

*To all whom it may concern:*

Be it known that I, MICHAEL J. KIRST, a citizen of the United States, residing at Barrington, in the county of Lake and State of Illinois, have invented certain new and useful Improvements in a Clutch Control, of which the following is a specification.

This invention relates to improvements in control means for pedals or foot levers.

The primary object of this invention is the provision of means for holding an operating lever, such as the clutch pedal of Ford automotive vehicles, in any of a number of positions.

A further and important object of this invention is the provision of a clutch pedal control construction embodying a novel arrangement of details for cooperating with an ordinary clutch pedal, and by means of which the clutch pedal may be held in any of a number of positions, independent of manual aid, to perform various operations in connection with mechanism adapted to be operated by the clutch pedal.

Other and important objects of this invention will be apparent during the course of the following detailed description.

In the drawings, wherein similar reference characters designate corresponding parts throughout the several views.

Figure 5 is an enlarged fragmentary cross sectional view showing novel pawl and ratchet means employed with this invention.

Figure 6 is a perspective view showing the application of this improved clutch pedal control mechanism with the conventional part of a Ford internal combustion engine and vehicle, and Figure 7 is a perspective view of a member which may be used for connecting an operating pedal to the foot rest of the conventional clutch lever.

Figure 1:
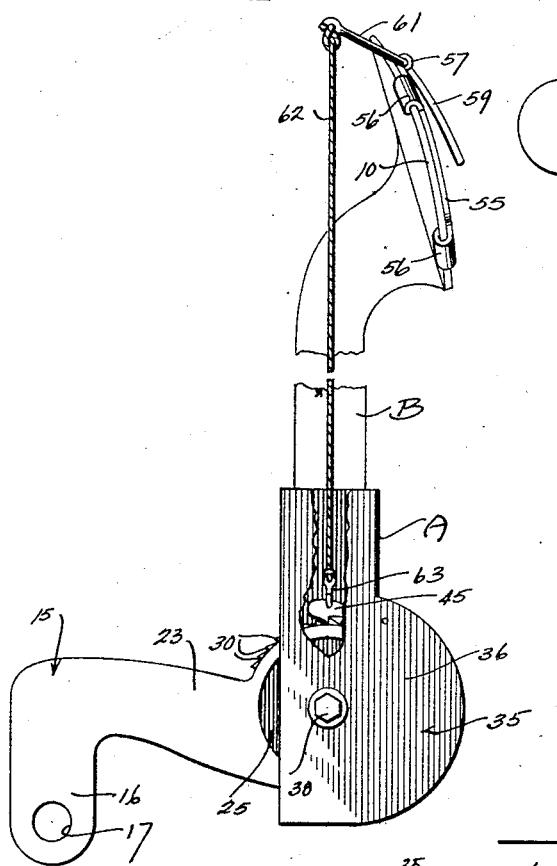
Figure 1 is a side elevation showing details of the improved construction for holding a foot pedal in different adjusted positions.

In the drawings, wherein for the purpose of illustration is shown but the preferred embodiment of this invention, the letter A may generally designate the improved mechanism which is adapted for association with a foot lever or conventional clutch pedal B. The clutch pedal B is the conventional clutch pedal which is employed in connection with the planetary transmission C of the Ford motor vehicle; the pedal B being pivoted to a shaft D for operation of the planetary mechanism in accordance with well known features. The foot lever B upwardly thereon has the conventional foot rest plate 10 rigid therewith.

Referring to the novel means A for holding the clutch lever B in a desired position, the same includes a substantially L-shaped arm 15, provided with a vertical portion 16 having an aperture 17 in one end thereof. This portion or leg 16 of the arm 15 is adapted to be placed in the channel groove of the crank case side support 20 of the vehicle with which the clutch pedal or lever B is associated; it of course being understood that the support 20 is carried by the chassis frame 21. The horizontal leg or portion 23 of the bracket 15, at its free end has a substantially disc shaped head 25, provided with a central opening 26 therethrough. A segment of the disc 25 is provided with teeth 30, and that portion of the disc 25 which has the teeth 30 may be referred to as a segment or a ratchet. The bracket 15 when bolted to the support and frame 20 and 21 respectively, has the opening 26 thereof axially aligned with the axis of the shaft D.

Figure 2:
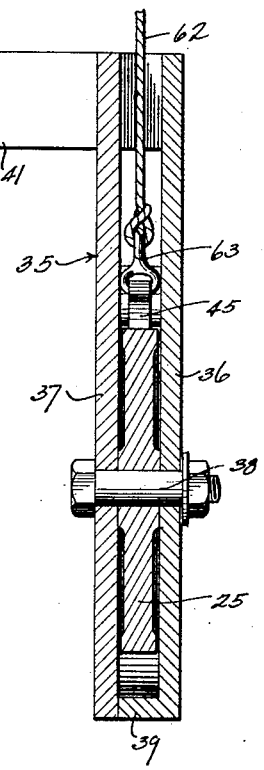
Figure 2 is an enlarged cross sectional view taken through a part of the mechanism illustrated in Figure 1.
Figure 3:
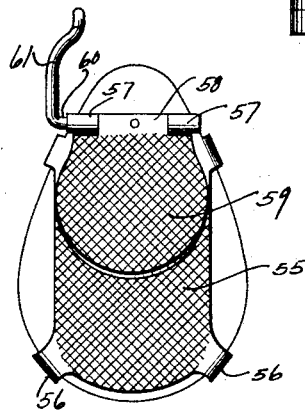
Figure 3 is a front elevation showing novel means for attaching an operating pedal to a foot lever with which the improved device is to be associated.
Figure 4:
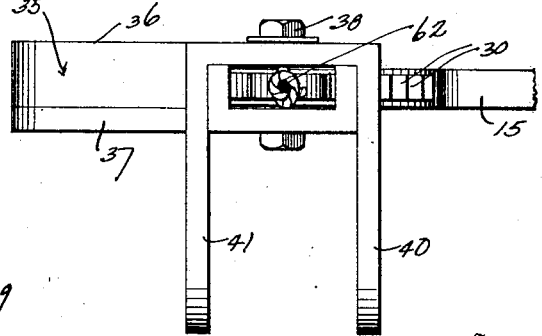
Figure 4 is a fragmentary view showing novel operating details of this invention.

A pawl carrying casing or member 35 is pivotally connected to the disc 25; this member 35 consisting of side plates 36 and 37 pivotally connected by means of a bolt 38 upon opposite sides of the bracket disc 25. The plate 36 is preferably provided with a segmental flange 39 which extends about and in spaced relation with the circumference of the disc 25, and abuts at its outer marginal edge with the inside surface of the plate 37, substantially as is illustrated in Figure 2 of the drawings. The plate 36 upwardly thereof is provided with the spaced laterally extending connecting arms 40 and 41 which receive therebetween the upper portion of the plate 37, so that the plates are connected for pivotal movement about the axis of the bolt 38. The arms 40 and 41 extend substantially at right angles to the plates 36 and 37, and they extend for a considerable distance beyond the plate 37, in order to receive therebetween a portion of the shank of the foot lever B, so that upon movement of the foot lever B the member or casing 35 will be pivotally moved upon its axis.

Within the casing 35, a pawl or dog 45 is pivotally connected, as at 46, having a tooth 47 at one end thereof remote from its pivotal connection, which is adapted to cooperate against teeth 30 of the disc 25. A leaf spring 50 is preferably provided, being supported by pins 51 upon the plate 36, and at its free end engaging the rearwardly extending lug 52 on the pawl 45; the tendency of the spring being to force the tooth 47 of the pawl 45 into engagement with the teeth about the segment of the disc 25 on which they are formed.

A connecting plate 55, of arcuate formation is provided for attachment over the front surface of the foot rest plate 10; the plate 55 having connecting flanges or lugs 56 which may be bent beneath the foot rest plate 10, to securely connect the plate 55 over the foot engaging surface of the plate 10. The plate 55 upwardly thereon is preferably provided with a pair of spaced barrels 57 which receive in aligning relation therebetween a barrel portion 58 of a small foot pedal or rest 59. A pintle 60 connects the barrels 57 and 58; the pintle 60 being rigidly connected to the pedal 59 and at an outer end thereof preferably having a lever arm or throw portion 61 thereon. The throw portion or lever portion 61 at its free end is preferably provided with an eye thru which may be threaded an end of a flexible cable 62. The cable 62 at its lower end may be connected by means of a hook or eye construction 63 with the pawl 45.

Referring to the operation of the foot lever B in connection with the improved construction A for holding the same in any desired relation, if it is desired to move the lever B forwardly the operator may engage with his foot the lower portion of the plate 55, and by pushing forwardly thereon the pawl at its free end may be slid over the teeth 30. Upon releasing his foot the pedal B will retain its forwardly pushed position, incident to engagement of the pawl 45 with the teeth 30. To release the clutch pedal to permit its rearward movement the operator needs merely to engage the pedal 59 and by depressing the same the pawl 45 will be lifted upwardly out of engagement with the teeth 30, and the operator may let the clutch pedal come back into the position desired. Upon release of manual pressure upon the pedal 59 the clutch lever B will be retained in the position desired.

The advantages of the foregoing invention will be apparent to those skilled in the art to which this invention relates. It is well known that clutch pedals of a certain well known type of automotive vehicle are with difficulty manipulated in order to secure the effective operation of the vehicle under all conditions. With the improved device A to hold the clutch lever B in the position desired the possibility of accident occuring is diminished. The vehicle transmission or other mechanism may be easily controlled, and the driving is facilitated, especially in connection with climbing of hills since it is not necessary to retain one foot upon the clutch lever for throwing the planetary transmission which the clutch pedal controls into high gear. The details of the invention are simple, and the device may be easily attached to conventional Ford cars in the manner disclosed in the drawings.

Various changes in the shape, size, and arrangement of parts may be made to the form of invention herein shown and described, without departing from the spirit of this invention or the scope of the claims.

I claim:

1. In combination with a pivoted foot lever including a foot rest plate, a mounting plate secured upon said foot rest plate, a pedal pivoted to the mounting plate in overhanging relation to the mounting plate, and pawl and ratchet means operably connected to the pivoted pedal whereby the foot lever may be held in desired adjusted position.

2. In combination with a pivoted foot lever including a foot rest plate, a mounting plate resting upon the foot rest plate and having side tongues bent under the foot rest plate to secure the mounting plate and having bearings at one end, a pedal above the mounting plate and having a bearing at one end, a pivot rod extending through the bearings to pivotally mount the pedal in overhanging relation to the mounting plate, said rod having rigid engagement with the bearing of the pedal and having one end portion extending from the mounting plate and bent to provide a throw portion, a stationary ratchet member, a pawl movable with the foot lever, and means connecting the pawl with the throw portion of the pivot rod for operation of the pawl when pressure is applied to the pedal during operation of the foot lever.

3. In combination with a pivoted foot lever, a stationary toothed segment, a member pivoted to the segment and connected to the foot lever for movement with the latter, a pawl pivoted to said member, a pedal pivoted to the foot lever, and means connecting the pedal with the pawl for operating the latter with respect to the teeth of said segment.

4. In combination with a foot pedal pivoted to a supporting structure, a bracket including a series of teeth, a pawl, a member pivoted to said bracket for pivotally supporting said pawl, said member having elements extending upon opposite sides of the foot lever for causing pivotal movement of said member with the foot lever, and means carried by the foot lever for operating said pawl with respect to the teeth of said bracket.

5. In combination with a pivoted foot lever, a bracket having teeth arranged thereor in an arcuate relation, said bracket being stationary with respect to the foot lever so that the teeth are concentrically arranged with the foot lever pivot axis, a casing pivotally connected to the bracket, means on said casing engaging the foot lever so that upon movement of the foot lever the casing will be moved upon said bracket, a pawl carried by said casing, spring means normally urging the pawl into engagement with the teeth of said bracket, a pedal carried by said foot lever, and means connecting the pedal to the pawl whereby upon operation of the pedal the pawl may be moved out of engagement with the teeth of said bracket.

MICHAEL J. KIRST.